(12) United States Patent
Hamilton et al.

(10) Patent No.: US 6,981,023 B1
(45) Date of Patent: Dec. 27, 2005

(54) MESSAGE ROUTING

(76) Inventors: Michael Hamilton, 1128 20th St., West Des Moines, IA (US) 50265; Walter E. Boland, 12065 Meridian Rd., Elbert, CO (US) 80106; Glenn Ricart, 16 E. Churchill Dr., Salt Lake City, UT (US) 84103

(*) Notice: Subject to any disclaimer, the term of this patent is extended or adjusted under 35 U.S.C. 154(b) by 0 days.

(21) Appl. No.: 09/521,152

(22) Filed: Mar. 8, 2000

Related U.S. Application Data

(60) Provisional application No. 60/123,661, filed on Mar. 9, 1999.

(51) Int. Cl.⁷ ............................................. G06F 15/16
(52) U.S. Cl. .................................... 709/206; 379/93.01
(58) Field of Search ................................. 709/204, 205, 709/206, 207, 217, 228, 218; 379/201.01, 379/93.24, 93.34, 93.25, 93.08, 93.15, 93.01

(56) References Cited

U.S. PATENT DOCUMENTS

| | | | | |
|---|---|---|---|---|
| 5,684,951 A | | 11/1997 | Goldman et al. | 395/188.01 |
| 5,774,552 A | | 6/1998 | Grimmer | 380/25 |
| 5,862,202 A | | 1/1999 | Bashoura et al. | 379/100.14 |
| 5,974,453 A | * | 10/1999 | Andersen et al. | 709/220 |
| 5,987,508 A | * | 11/1999 | Agraharam et al. | 709/217 |
| 6,020,980 A | | 2/2000 | Freeman | 358/402 |
| 6,085,231 A | * | 7/2000 | Agraharam et al. | 709/206 |
| 6,104,789 A | * | 8/2000 | Lund | 379/93.23 |
| 6,233,234 B1 | * | 5/2001 | Curry et al. | 370/356 |
| 6,353,852 B1 | * | 3/2002 | Nestoriak, III et al. | 709/206 |
| 6,363,414 B1 | * | 3/2002 | Nicholls et al. | 709/206 |
| 6,373,926 B1 | * | 4/2002 | Foladare et al. | 379/88.13 |
| 6,374,246 B1 | * | 4/2002 | Matsuo | 707/10 |
| 6,417,930 B2 | * | 7/2002 | Mori | 358/1.15 |
| 6,421,708 B2 | * | 7/2002 | Bettis | 709/206 |
| 6,466,570 B1 | * | 10/2002 | Low et al. | 370/352 |
| 6,477,242 B1 | * | 11/2002 | Freeny, Jr. | 379/93.24 |
| 6,539,077 B1 | | 3/2003 | Ranalli et al. | 379/67.1 |
| 2002/0176117 A1 | | 11/2002 | Randalli et al. | |

OTHER PUBLICATIONS

Mackenzie, "Local web-to-phone patent 'infringed'" (3 pages total), Australian IT, Jun. 18, 2002.

Australian Patent Administration System report, App. Id: 23029/01, report dated Jul. 2, 2002 (earlier dates for application are specified in the report).

(Continued)

*Primary Examiner*—Glenton B. Burgess
*Assistant Examiner*—Kimberly Flynn
(74) *Attorney, Agent, or Firm*—Ogilvie Law Firm

(57) ABSTRACT

Methods, devices, signals, and systems are provided in a message routing architecture which provides improved capabilities for integrating "digital" communication through email messages with "analog" communication through voice and/or fax or pager messages. Email can be addressed using nothing more than a standard telephone or fax number. If the registered owner of the telephone or fax number has a corresponding email address, then the invention converts the telephone or fax number to the email address for delivery and uses standard email delivery systems to deliver the message. If no conventional delivery email address is known, or if the message sender or recipient specify multiple delivery modes, then the email message content is transformed into voice, pager and/or fax content and delivered to the recipient using the telephone or fax number which was specified as the email address. Familiar telecommunications services such as call forwarding and selective call blocking can also be used with messages that originate as email. The invention also supports use of telecommunications numbers as indexes into databases which contain public key certificates, to make it unnecessary for a proposed message recipient to provide its public key expressly in advance to each particular proposed message originator.

44 Claims, 5 Drawing Sheets

OTHER PUBLICATIONS

Australian Patent Administration System report, App. Id: 23028/01, report dated Jul. 2, 2002 (earlier dates for application are specified in the report).
Australian Patent Administration System report, App. Id: 74978/00, report dated Jul. 2, 2002 (earlier dates for application are speciified in the report).
PCT published application with International Search Report, Pub. No. WO 01/20490, earliest priority date Sep. 15, 1999.
Australian Petty Patent No. 737223, filed Feb. 16, 2001.
Australian Petty Patent No. 737222, filed Feb. 16, 2001.
Preliminary English translation of Japanese Patent Publication No. JP406261069A.
PCT Written Opinion, Jan. 10, 2001.
Japanese Patent Publication No. JP406261069A w/ English cover page, Sep. 16, 1994.
PCT Application, Publication No. WO 98/13996, Apr. 2, 1998.
PCT Application, Publication No. WO 00/41383, Jul. 13, 2000.
"How a Phone Number May One Day Become Your Internet Address", Wall Street Journal, B1, Jan. 8, 2001.
"Internet Technical Manager Narrows Field of Address Suffixes", Wall Street Journal, B12, Nov. 13, 2000.
www.netnumber.com web site page, no later than Jan. 24, 2001.
RFC 2916, Sep. 2000.
"VeriSign, Telcordia Hope to Have Your Number", Sep. 26, 2000.
"VeriSign And Telcordia Announce Opening of the First Public ENUM Trial", Dec. 20, 2000.
"Linking IP Addresses to Phones", no later than Jan. 17, 2001.
www.enumworld.com web site pages, pp. 1-6, no later than Jan. 17, 2001.
Tanenbaum, *Computer Networks* (3$^{rd}$ Ed.); pp. 643-669; 1996.
EMA web pages; pp. 1-17; no later than Feb. 24, 1999, some clearly earlier.
citlink web pages; pp. 1-7; no later than Mar. 3, 2000.
muentel web pages; pp. 1-2; 1997.
"Now, for Free, You've Got Voice Mail", Wall Street Journal, p. B1, Jun. 7, 1999.
inconnect web pages; pp. 1-2; 1999.
Goals for Voice Profile for Internet Messaging; pp. 1-9; Jan. 6, 1999.
VPIM Addressing; pp. 1-7; Feb. 26, 1999.
Multi-Media Shared Directory Service: Proposal for a Service Trial (An EMA VPIM Work Initiative); pp. 1-17; Oct. 22, 1997.
VPIM Voice Messaging Directory: Integrating with Corporate X.500 Directories; pp. 1-19; Apr. 4, 1997.
Address Resolution for Voicemail Systems; pp. 1-12; Sep. 16, 1996.
med-com web pages; pp. 1-7; no later than Mar. 4, 1999.
VoiceNews; one page; Dec. 1997.
Yahoo! People Search; one page; no later than Feb. 25, 1999.
The Business Journal; pp. 1-4; Jun. 15, 1998.
jfax web pages; pp. 1-13; no later than Feb. 25, 1999.
gte web pages; pp. 1-6; no later than Feb. 25, 1999.
lotus web pages; pp. 1-2; no later than Feb. 25, 1999.
FAQ: How to find people's E-mail addresses; pp. 1-14; May 10, 1998.
Web Phone: Sizzle But No Steak; pp. 1-2; no later than Feb. 25, 1999.
Business Partner—NetExperts; one page; no later than Feb. 25, 1999.
Mail Scout Overview; pp. 1-3; Jul. 1, 1997.
Portico FAQs; pp. 1-3; 1998.
Understanding encryption and SSL; pp. 1-36; no later than Feb. 24, 1999.
phone.com data sheets; pp. 1-4; no later than May 3, 2000.
webley web pages; pp. 1-7; no later than May 3, 2000.
Webley Systems press release; pp. 1-3; Sep. 15, 1998.
eagletech1 web pages; pp. 1-2; no later than May 3, 2000.
eCharge web pages; pp. 1-7; no later than Apr. 3, 2000.
PCT Search Report, Jul. 6, 2000.

* cited by examiner

MESSAGE ROUTING

RELATED APPLICATIONS

The present application claims priority to, and incorporates by reference, U.S. provisional patent application Ser. No. 60/123,661 filed Mar. 9, 1999.

FIELD OF THE INVENTION

The present invention relates to the capabilities of systems and methods which route messages in the form of email, live voice connections, voice recordings, video, and faxes, and the invention relates more particularly to the use of existing telephone or fax numbers as email addresses and to attendant uses of voicemail, faxes, video, and/or synthesized or live speech to deliver messages which originate as email text, voice input, video input, or otherwise, using cell phones, wireless devices, computers and/or other devices for "any-to-any" communications.

TECHNICAL BACKGROUND OF THE INVENTION

Various approaches have been taken to messaging. Voice, video, and fax communications through telecommunications systems are well-known, as are email communications through computer networks. Many attempts have been made to integrate traditional telecommunications with computer networks.

For instance, fax software allows computer users to easily convert digital files into fax format and send faxes directly from a computer. Computer telephony software allows computer users to maintain a database of telephone numbers and to have their computer dial a selected number for subsequent voice communications. Internet telephony software allows computer users to transmit voice communications over the Internet as digital packets (similar to the transmission of email messages in digital packets). Computerized advertising systems exist which automatically dial a sequence of telephone numbers and attempt to deliver a recorded message to each recipient.

Telecommunications systems themselves also rely heavily on computers to manage circuits, voicemail boxes, accounting, billing, and other functions. Likewise, computer networks often use the telecommunications infrastructure to carry digital packets, over Internet dial-up connections, direct modem-to-modem connections, and other telecommunications connections.

A messaging service which is advertised and described at a jfax web site apparently operates as follows. (Because USPTO policy prohibits inclusion of hyperlinks in patents, the jfax web site address is not stated expressly here. However, the jfax web site address can be produced by typing "www" followed by a period followed by "jfax" followed by a period followed by "com". To conform with USPTO policy, other web site addresses noted below are likewise restated using "period" instead of being stated expressly.) The service provider provides each subscriber with a special-purpose "private" telephone/fax number in a city specified by the subscriber. The "private" number is apparently not a number published to assist voice communications, that is, it is not typically listed in white pages or other telephone directories or available through directory service. This private number can be used to provide subscribers with access by phone to their email messages. When the subscriber calls in, the subscriber's email messages are read to the subscriber over the phone using synthesized speech after the system connects to the subscriber's Internet service provider. Voicemail can also be accessed using the same private phone number. By dialing a toll-free access number and entering an access code, subscribers can apparently send email to any fax machine, reply to email with a voice message, and manage their messages. The provider links the unique private phone number to email in order to route the subscriber's voicemail and faxes to email. If the subscriber has access to a computer, then the subscriber can play voicemail on the computer's speakers and display faxes on the computer's screen. Subscribers must apparently download special-purpose software to their computers in order to access (as email message attachments) faxes or voicemail sent to their private phone number. In short, a private telephone number can be used to access email messages which were apparently addressed using conventional email addresses, and voice or fax messages can be converted to email attachments.

A voicemail messaging service is also discussed in "Address Resolution for Voicemail Systems: X.500 Methodology", which was obtained from the Electronic Messaging Association web site at www period ema period com/vpimdir/directory/method.txt. The Address Resolution document and other documents in www period ema period org/vpimdir refer to and/or describe a Voice Profile for Internet Mail (VPIM) specification. These documents, including Internet Engineering Task Force drafts on topics such as VPIM Addressing and Goals for VPIM, and papers on Voice Messaging Directories, Multi-Media Shared Directories, and other topics, are collectively referred to herein as the "VPIM Documents" and are incorporated by this reference. The voicemail messaging systems described in the VPIM Documents would apparently operate in ways which are consistent with the details described below.

In some cases, voicemail messages would be encoded by VPIM systems as *.wav files or otherwise encoded as digital files, and would be sent as attachments to an email message. Fax messages would likewise be transmitted as email attachments.

Various VPIM email addressing schemes are described, but they appear to be of two types. The first addressing scheme includes addresses of the form LHS@Domain, where LHS is a telecommunications number and Domain is an Internet domain name. Examples given in the VPIM Addressing document include:

1) mailbox number—for use as a private numbering plan (any number of digits).
   e.g. 5552722@lucent.com;
2) mailbox number+extension—for use as a private numbering plan with extensions any number of digits, use of "+" as separator.
   e.g. 5552722+111@lucent.com;
3) +international number—for international telephone numbers conforming to E. 164 maximum of 15 digits.
   e.g. +16137637582@nortelnetworks.com;
4) +international number+extension—for international telephone numbers conforming to E. 164[0] maximum of 15 digits, with an extension (e.g. behind a PBX) that has a maximum of 15 digits.
   e.g. +17035245550+230@ema.org;

The second addressing scheme includes attribute-value pairs with special attributes such as a VPIM attribute and/or a voice outdialing service selector attribute. Example pairs given in the VPIM Addressing document include VPIM=6137637582 and VOICE=+3940226338.

An email to pager gateway described at www period inconnect period com/pager.html takes an email message and sends it to an alphanumeric pager. Messages must be sent to a specially formatted address:

abc1234567@pager.inconnect.com where abc is the page provider code (e.g. "att" for AT&T Wireless or "sky" for SkyTel) and 1234567 is the pager's PIN number.

A wide range of message routing features and capabilities have thus been explored before now, at least to some extent. However, known approaches have not combined features and capabilities into an architecture which properly leverages the existing widespread use of telephone and fax numbers with the capabilities of email and databases.

In particular, the jfax approach uses new, private telephone numbers to allow access to email, rather than allowing the use of existing telephone numbers as email addresses. The VPIM approach does use existing phone and fax numbers in email addresses, but it imposes an awkward addressing syntax on message originators. VPIM is also apparently directed toward the use of email systems to carry voicemail recordings, as opposed to using phone and fax numbers to identify email destinations. Accordingly, it would be an advancement in the art to provide an improved architecture for routing messages using the enormous existing body of telecommunications numbers and features, including pay-per-use features and options.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, signals, and configured storage media for message routing. The invention allows message originators to use telephone and fax numbers as email and/or web addresses. In particular, the invention supports use of publicly listed phone or fax numbers as email addresses without company or similar domain names as apparently required by the VPIM approach. The telephone and fax number addresses (which may include area codes, extensions, and the like) are converted by the system into IP addresses, Ethernet addresses, username-domain name addresses, attribute-value pairs, and/or other conventional email addresses or addressing indexes.

System Overview

Figure 1:
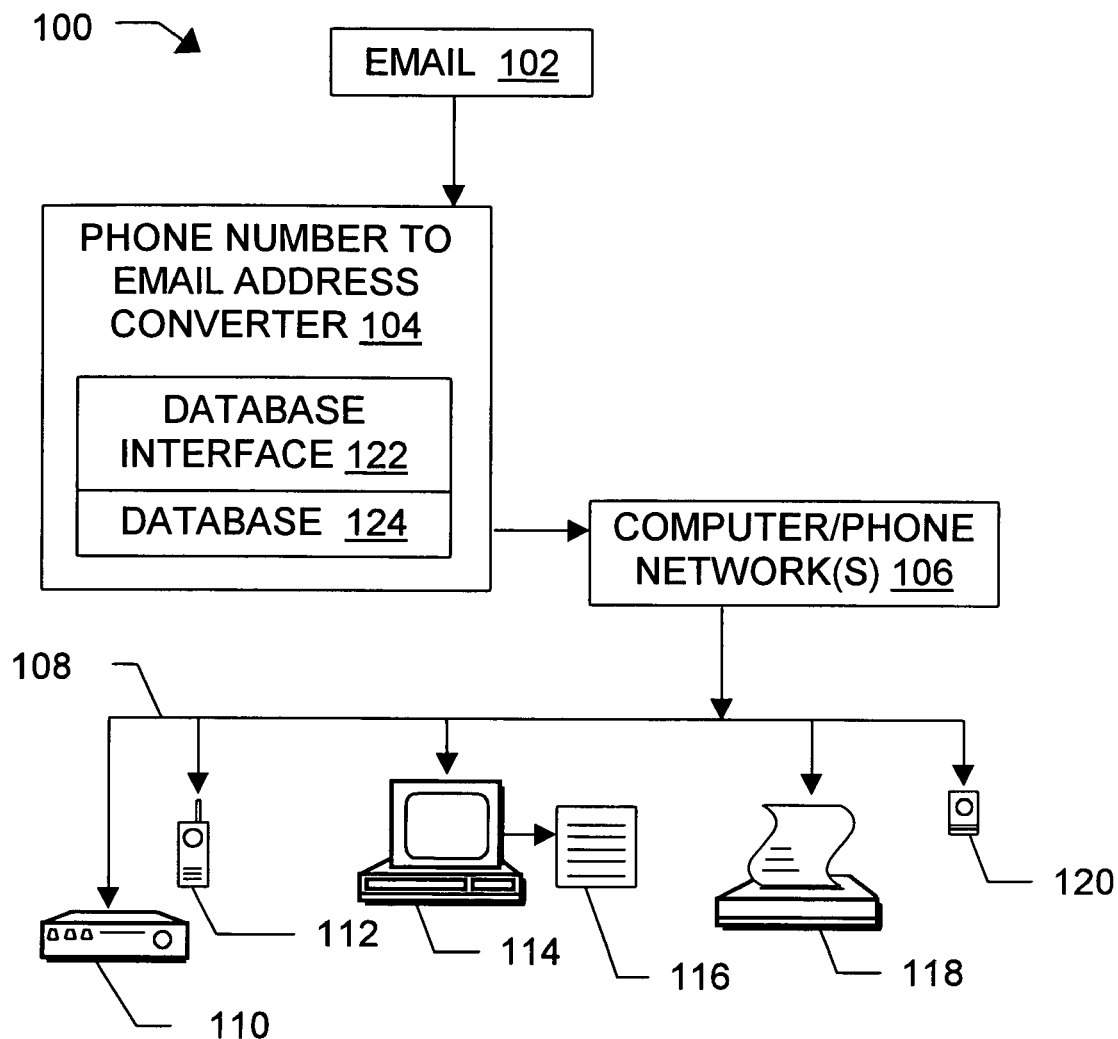
FIG. 1 is a diagram illustrating a network of computers and other devices which are individually and collectively among the many systems suitable for use with the present invention.

FIG. 1 gives an overview of a system 100 according to the invention. The email 102 itself is carried over one or more networks 106 to the destination(s) indicated by the email's address. The term "email" includes text generated using a computer and an email program, such as Microsoft Outlook, QualComm Eudora, Microsoft Hotmail, and so on, as well as text generated using handheld devices, whether wired or wireless. The term "email" also includes attachments obtained by converting live video or voice phone messages and/or voicemail messages through inventive and/or known methods. Likewise, a fax message sent to a fax number can be considered an email 102 message if it uses the systems and methods of this invention.

As used here, "network" includes computer networks such as local area networks, wide area networks, metropolitan area networks, wireless networks, and/or various "Internet" networks such as the World Wide Web, a private Internet, a secure Internet, a value-added network, a virtual private network, an extranet, or an intranet. Such computer networks may form part of a telecommunications network and/or interface with a telecommunications network. Signal lines 108 used to carry, store, and/or deliver messages according to the invention may include twisted pair, optical fiber cables, coaxial cable, telephone lines, satellites, radio waves, microwave relays, modulated AC power lines, and other data transmission "wires" known to those of skill in the art. Methods such as TDMA, CDMA, FDMA, and other encoding and/or multiplexing methods may be used, as well as GSM, PDC, Wireless Application Protocol, and other technologies and protocols. Signals according to the invention may be embodied in such "wires" and/or in addressable storage media (volatile and/or nonvolatile). Note that the term "wire" as used herein thus refers to both wired and wireless communications.

The email 102 is delivered in one or more of the following ways: as synthesized speech created by reading that email text into a voice mailbox 110 or to a live recipient who answers a phone 112 associated with a phone number that was used as an email address; as speech or text translated by a computer or a person from one natural language (e.g., English, French, Chinese, etc.) into one or more other natural languages; as "live speech" created by an operator or human person other than the message originator who is reading the email text out loud, either in real time or as a delayed message, e.g., to voicemail or an answering machine 110; as text email 114, possibly with files attached by the message originator using a desktop computer 116, or another computing device such as a handheld computer, mobile phone, or other wireless appliance; as a video stream to a computer and/or other video-capable device; as a fax created by converting the email into conventional fax format for delivery to a fax machine 118 whose fax number was used as an email address or addressing index; and/or as a pager message created by converting the email into pager format for delivery to a pager 120 whose pager number was used as an email address or addressing index. Natural language translation may be performed manually or automatically in connection with text-to-speech and/or speech-to-text transformations of the message.

Telecommunications Numbers

The telephone (land or mobile), fax, and/or pager numbers which are used as email addresses or addressing indexes according to the invention are referred to collectively as "telecommunications numbers". Telecommunications numbers are normally used to call, fax, and/or page people. Examples are found in standard telephone directories (including white pages, yellow pages, blue pages, online directories, toll-free directories, and the like), Rolodexes, and on business cards. They are generally publicly listed, but they may include unlisted numbers if the telephone customer consents to their use. Telecommunications numbers may include the digits 0 through 9, and in some cases may also include commonly used characters such as +, −, (,), /, #, *, or comma. Telecommunications numbers do not typically include alphabetic characters (except to the extent they substitute for numbers, as occurs in many toll-free business numbers), or nonprintable characters. Telecommunications numbers may be personal or business numbers, and include without limitation 800-numbers and other toll-free numbers, 900-numbers, and numbers for mobile phones. They may be of various lengths, including without limitation ten-digit North American numbers, contemplated twelve-digit numbers, lengths used in other locales, and/or "unique" personal messaging identifiers.

In practicing the invention, the telecommunications number may replace an entire conventional email address username@domain or web address www.website.com, or it may replace most of that address. For instance, in some embodiments the email is addressed using the telephone or fax number alone, as in "1234567" or "123-4567" for a local number or "123-456-7890" for a long distance number.

For instance, a sample message 102 might resemble this one:
To: 555-1234
From: Mike
Subject: Status?
CC:
How's it coming?

In some embodiments, the telephone or fax number replaces the domain, as in examples such as "@1234567", "@1234567.com", "@1234567. org", or "@1234567.net" for a local number, or "@1234567890", "@1234567890.org", and so on for a long distance number. The latter approach effectively associates a domain name or a web site with each telephone number. Appropriate integration between domain name directories, available domain name and IP addresses, and advancements in IP addressing are possible. For instance, these individual telecommunications number domain names could be registered, looked up, converted to IP addresses, and otherwise managed with the existing infrastructure in a manner similar to that now done for conventional domain names (which do not correspond to telecommunications numbers). For instance, this could be accomplished using Internet browsers as an interface. It could also use mappings such as the mapping between keywords and Internet locations provided through RealNames Corporation, for example.

Thus, another message 102 is addressed like this one:
To: 555 4567
From: 555-1234<Bob>
Subject: Status?
CC: @11115552222.com
Mike would like a status update. Please call me.

Telecommunications Systems

Telecommunications numbers which are provided by a message originator as an email address ("email address" also includes web addresses hereafter, unless indicated otherwise) are converted 104 to conventional email addresses by performing with a search engine/database management system/similar software 122 a lookup in a database 124. The database 124 may be built on-the-fly by individual message originators, message recipients, and/or by their employers, Internet service providers, and/or telecommunications service providers, for instance. The database 124 may be a simple text file or other file maintained by a client email program 122 or web browser 122, or it may be a complex relational or hierarchical object-oriented database 124 maintained by a corporation, individual, non-profit, or government agency, for instance. Suitable databases 124 may be implemented using database software 122 from Novell, Oracle, or other vendors; as noted, conventional Domain Name System software 124 may also be used according to the invention. Suitable database interface software and/or other software for implementing the invention is also readily provided by those of skill in the art using the teachings presented here and programming languages, tools, and standards such as Java, Jini (mark of Sun), Pascal, C++, C, CGI, Perl, SQL, X.500, DB2 (mark of IBM), ODBC, LDAP, NDS (mark of Novell), APIs, SDKs, ASICs, FPGAs, assembly, firmware, and microcode. In particular and without limiting the foregoing, the invention could be implemented as code embedded in the operating system and/or "burned into" a chip or chipset in a handheld communications device.

Providing Access to the Invention

To the extent that client software is required, it could be provided on a disk or CD sent by regional Bell operating companies or other entities, or it could be downloaded from a web site. A registration message could provide the web site with the registrant's phone number in various ways. In particular, registration might be initiated by sending the web site an email address specifying the registrant's telephone number in an address field; this may be contingent on prior biometric authentication or prior automatic number identification (ANI). Necessary software such as email software or browser software could also be provided on free PCs, which are being made increasingly available as the price of computers falls. A "black box" located between a modem and the telephone wall jack or other phone jack could also be used to divert messages into a system 100 which correlates telephone numbers with email addresses, public keys, and/or other data according to the present invention. The "black box" could also be implemented in email software or browser software, and could link to a search mechanism such as the RealNames.com technology for mapping keywords to web addresses. A similar "black box" signal interception could be performed for wireless communications. A "black box" approach does not necessarily require use of a domain name or the separator "@" in novel email addresses provided by the message originator. One might also divert messages through handshakes with large ISPs such as AOL and TCI.

Call forwarding could also be used to divert messages into a messaging system according to the invention. Such forwarding would need to be authorized by the telecommunications subscriber, and could be performed by the telecommunications provider, or by the subscriber, or on a per-use basis. This approach does not necessarily require use of a domain name or "@" separator in novel email addresses provided by the message originator.

Extending Existing Telecommunication Services

By accessing standard telecommunications databases and/or equipment, features and services (such as so-called "class services") already used with voice or fax communications may also be provided to email messaging in a system 100 according to the present invention. For instance, suppose a communication is addressed to a first telecommunications number which the telecommunications provider is currently forwarding to a second telecommunications number. Conventionally, only voice or analog communications would be forwarded. But the invention permits email communications 102 which are addressed to the first telecommunications number to likewise be forwarded, for delivery to the email address associated with the second telecommunications number and/or for delivery as a voice, video, fax, and/or pager communication to the second telecommunications number (possibly via synthesized or live speech, or conversion to fax format).

Call blocking could also be used according to the present invention. For instance, suppose party A does not wish to receive email, voicemail, or faxes from party B. Conventional telecommunications call blocking services will only block incoming voice or fax messages from numbers which are known to be associated with party B. But that blocking service can be extended using the present invention. When B's telecommunications number is used as an email addresses, mail which comes from that number is also blocked from reception by party A. When conventional email addresses are used by party B, email which comes from an email address that corresponds to the telephone number of party B is also blocked.

Other examples of existing telephone company or regional Bell operating company features that could be used in novel ways according to the present invention include: multiple line call waiting/ID; anonymous call rejection; blocked call rejection; call curfew; call detector; call rejection; custom ringing; long distance alert; message waiting indicator/notification; pagers; priority call; remote access forwarding; scheduled forwarding; selective call forwarding; and calling cards. The invention may interface with existing databases and programs of one or more telephone companies, regional Bell operating companies, wireless communication service providers, and/or unified messaging service providers to fully utilize any or all existing or future analog/voice services and features. The invention could also increase use of directory (standard and reverse) assistance and voicemail.

Configured Storage Media

Computers which provide message originators with email software and/or computers which manage the database of telecommunications numbers and email addresses are generally capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, PROMs, random access memory, and other computer system storage devices. The physical configuration represents data and instructions which cause the computer system to operate in a specific and predefined manner as described herein. Thus, the medium tangibly embodies a program, functions, and/or instructions that are executable by computer(s) (including servers, routers, desktops, handhelds, and other devices) to recognize telecommunications numbers as email addresses and route email messages for delivery, substantially as described herein.

VPIM and the Invention

There are apparently at least two important differences between the approach described in the VPIM Documents and the present invention. First, no reference has yet been found in the VPIM Documents to the use of a telecommunications number as an email address or other addressing index without either a corresponding conventional domain name or the bulky and inconvenient attribute-value pair syntax. By contrast, embodiments of the invention allow message originators to use a simple telecommunications number as an email address or other addressing index in place of some or all of the conventional domain name and/or in place of some or all of the conventional username and domain name. Although address syntaxes like those described in the VPIM Documents might be used internally by the invention, they are not imposed on message originators.

Second, VPIM appears to be primarily concerned with delivery of voicemail. That is, messages originate as voicemail, message content may be transported as email, and message content is ultimately delivered as a recording of the original message. By contrast, messages routed by the invention originate as voice messages, as email text, or as faxes, and message content may be ultimately delivered as email text, as synthesized or live speech, as a fax, to a pager, or as some combination of these delivery modes.

Public Keys

The invention also includes tools and techniques for using telephone or other telecommunications numbers as identifiers for public key certificates. For instance, in one system, an email message originator creates an email message 102 which is addressed to a recipient whose public key is on file with the telecommunications provider, ISP, or other entity linked to the inventive system. Instead of arranging with the recipient for a public key exchange or presentation through preliminary email, the message originator simply provides the inventive system with the message recipient's telecommunications number. The system then looks up the recipient's public key in an appropriate database, such as an X.509 database, obtains the public key, and uses the recipient's public key to encrypt the email message or other data. The same system that obtained and used the public key could then provide the encrypted message to an otherwise conventional email delivery system or to a novel email delivery system. That is, use of a telecommunications number to obtain a public key may be combined with use of a telecommunications number as an email address or addressing index, or either use may be performed independently of the other.

Methods

The invention may be embodied in one or more methods, systems, signals, and/or configured storage media. Those of skill in the art will apply the teachings provided here to various embodiments as appropriate. In particular, unless clearly indicated otherwise the discussion herein of any particular type of embodiment (methods, systems, configured storage media, signals) also applies to the other embodiment types.

Figure 2:
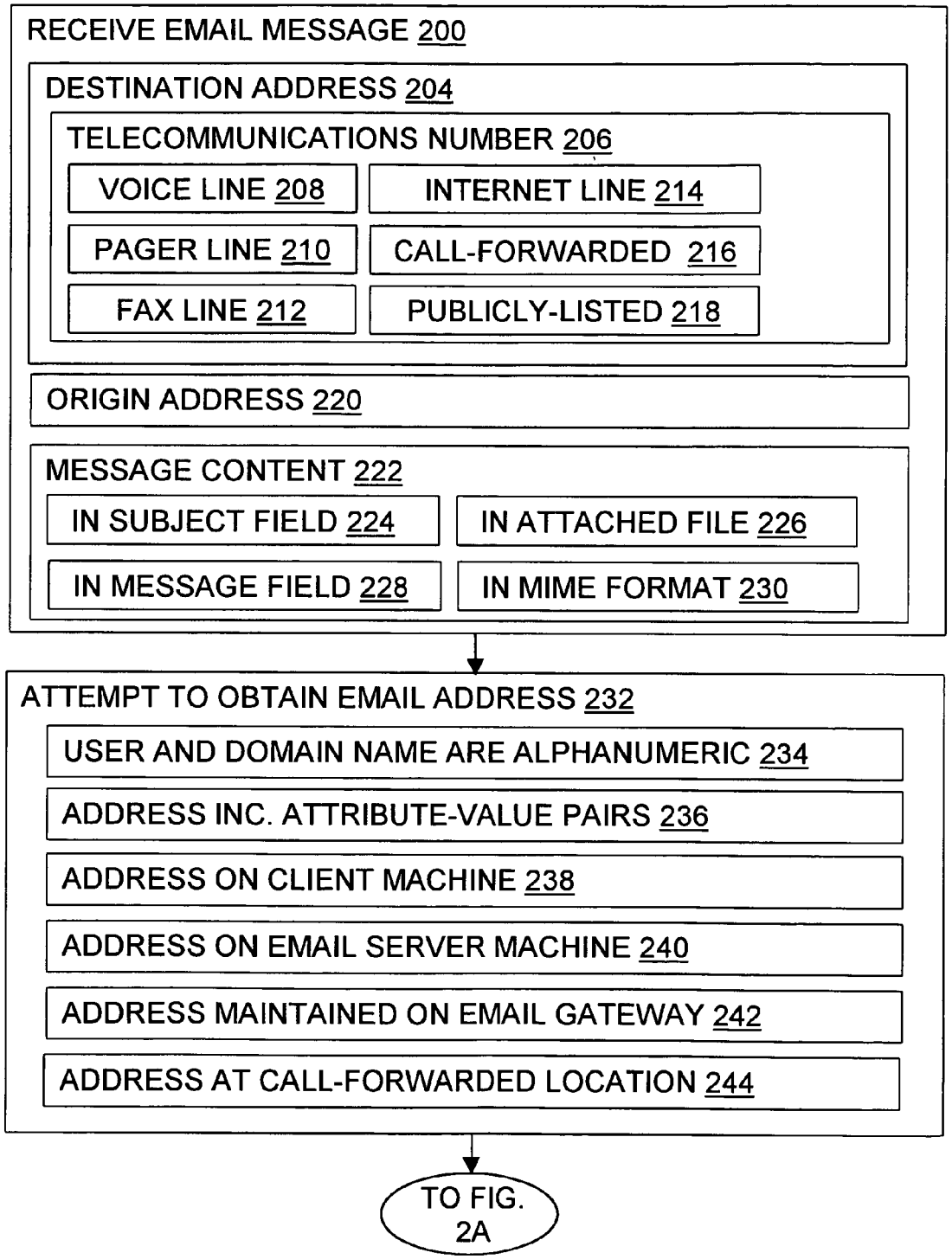
FIG. 2 is a first portion of a flowchart illustrating methods of the present invention, with data structure annotations.
Figure 2A:
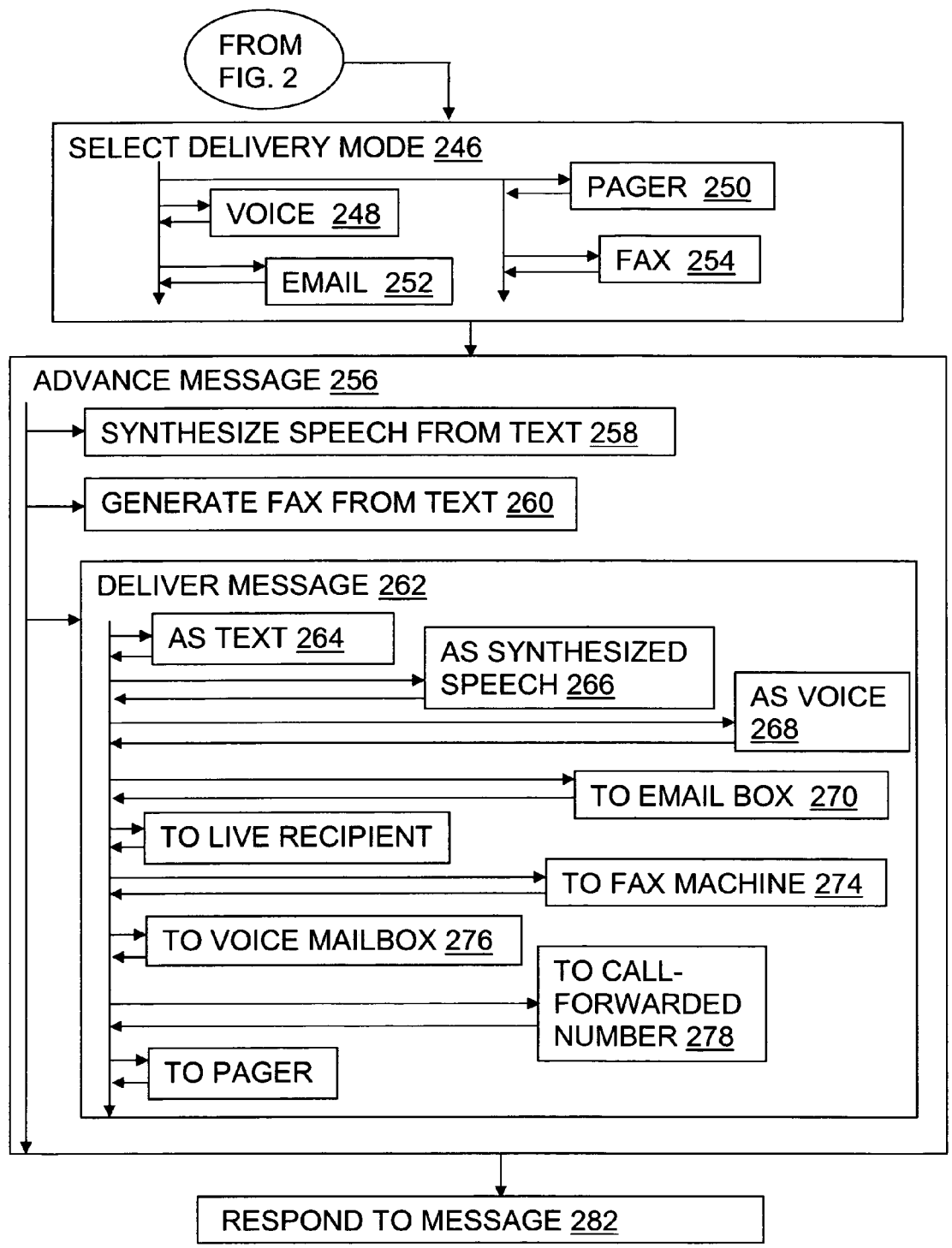
FIG. 2A is a continuation of the flowchart begun in FIG. 2, illustrating methods of the invention.

Some methods of the invention are illustrated in FIGS. 2 and 2A. During an email message receiving step 200 at least one email message 102 is received. The email may be received by any conventional method, such as using a standard protocol such as TCP/IP, UUCP, SMTP, and so on. The email may also be received using inventive methods as described herein. The email 102 received includes or otherwise specifies a destination address, as indicated by structural annotation 204. (For convenience, "include" will be understood hereafter to mean "include or otherwise specify, e.g., by a pointer or link".) The destination address 204 itself may appear in many forms, but in embodiments that replace some or all of a conventional address as discussed above it must include a telecommunications number 206. The telecommunications number 206 may occur in many forms, both existing and inventive. For example, the telecommunications number 206 may be a standard North American Numbering Plan telephone number, such as those used in the United States, consisting of a three-digit area code, three-digit prefix, and four-digit line number, or it may include just the prefix and the line number, or it may also contain a international prefix. The telecommunications number 206 may follow some other format, such as the eight-digit local Australian format, the two-digit Australian area code followed by the eight-digit local Australian format, and so on.

The telecommunications number 206 may also be of various types. For example, the number might connect to a voice line 208 (including a land line or a mobile/wireless "line"), a pager line 210, a fax line 212, or an internet dialup line 214 or other modem line. The line, of whatever type, may be call-forwarded 216, so that the original telecommunications number is routed to another number, or subject to other services identified above. The call-forwarded line 216 may be call-forwarded itself, and so on. The voice line 208 may be used for live voice communications, for voicemail communications, or both. The same telecommunications number phone line might be used at different times for one or more of live voice, voicemail, fax and/or internet connections.

The line will generally be publicly listed 218, but may be a private/unlisted number, that is, it may not be available through directory assistance. It may be a toll-free (e.g., 800- or 888-) number. If publicly listed, the telecommunications number section of the email destination address may be obtained through directory assistance, by looking it up in a paper or electronic phone book, by searching for it on the internet, or by some other public method.

Conventional email address format resembles username@domainname.extension. The telecommunications number 206 may be the domain name field of the internet address such that the address takes the form username@5551111, where "username" stands for a string of alphanumeric characters, and 5551111 stands for a telecommunications number. The 7-digit phone number was used in the example simply as shorthand for all possible telecommunications numbers, so an eight-digit Australian local number or a ten-digit North American Numbering Plan Number would each be valid.

The mail message 102 will also generally include an origin address 220. This address 220 may be a conventional email address, or it may us a telecommunications number according to the present invention as discussed for destination addresses 204, with the stated difference that the origin address 220 identifies the message originator rather than the message recipient.

The email may contain message content 222, but will not necessarily contain such content, any more than conventional email messages contain content. If message content 222 is present it may be found in a subject field 224, in one or more attached files 226, in a message field 228, or in some other location known to those of skill in the art. The message may be text, which may include a pager message, a live voice, a voicemail message, a video, an audio file message, or some other format known to those of skill in the art. The message itself may be in a variety of formats, such as Multipurpose Internet Mail Extensions format (MIME format) 230 or other known or inventive format. The email may be encrypted and/or digitally signed.

A conversion attempting step 232 attempts to transform the telecommunications number 206 and the destination address 204 into an email address or other addressing index that permits delivery of the message, such as a conventional email address, IP address, or the like. If an email address permitting delivery is not obtained then the message can be delivered by voice (synthesizing text to speech if necessary) to the telecommunications number 206 given in the destination address. The message can then be delivered to a live voice line (including a land line or a mobile/wireless "line"), a voicemail box line, a fax line, a pager line, or an inventive type of phone line.

Methods to modify the telecommunications number into an addressing index for delivery include, but are not limited to, looking up the email address 204 on a client machine 238, on an email server machine 240, and/or on an email gateway 242 using the telecommunications number as an index (or a pointer) into the stored email addresses, using database and other lookup methods known to those of skill in the art. The telecommunications number 206 can be used as an index into a database of public keys to obtain a public key corresponding to the telecommunications number.

In one embodiment, the telecommunications number 206 is call-forwarded 244 to a separate location. At this new location, the system 100 again attempts to obtain a conventional email address permitting delivery of the message as email. One method of obtaining the delivery email address is to use the first telecommunications number 206 as an index into a database which can be accessed using the call-forwarded number. Once access to the database is gained, the original telecommunications number 206 can be used as a pointer to the delivery email address within the database. If a delivery email address can be obtained, the message is sent using that address. In some cases, if no address can be located, the message can be sent to the destination phone number as voicemail, fax, and so on.

The delivery email address obtained during step 232 may take various forms. For instance, it can include conventional attribute-value pairs 236, such as those described above in connection with the VPIM Documents. In some embodiments of the invention, the username and the domain name of the delivery email address are restricted to alphanumeric characters 234.

A delivery mode selecting step 246 determines preferences for how the email message content will be delivered. The choices include sending a voice message 248; sending an email text message 252, which may include one or more attached files, an audio file, a video file, and so on; sending message content to a pager 250; and/or sending it to a fax machine 254. One of these delivery modes, several of them, or all of them may be selected and/or used by default for a given message, a given message originator, a given message recipient, and/or a given message destination. If no delivery email address is obtained in the attempting step 232, then the message may be automatically routed to the destination telecommunications number using delivery modes other than email, thereby ensuring that the message is sent. In some embodiments, if no delivery email address is obtained, the message is sent using all possible remaining delivery modes during step 246.

A message advancing step 256 modifies the message, if necessary, into the appropriate form (or forms) selected for delivery. For example, if the message was originally text but voice 248 was selected as one of the delivery modes, then speech will be synthesized 258 from the text. If fax delivery 254 was selected, then an appropriate fax document will be created 260. If pager 250 delivery was selected then a pager message will be generated by step 256. If the message was originally speech but text is selected 110 then the speech is transcribed using familiar speech recognition tools. Other combinations not listed as specific examples are also allowable.

Once the message has been put into the appropriate form (or forms), it is "delivered" during a delivering step 262. Delivery here does not mean that the recipient necessarily receives the message in the sense of opening and reading or hearing it, but rather means that the message is sent to a location accessible to the recipient. The message can be sent at least as text 264, as synthesized speech 266, and/or as a live voice message 268.

Variations are possible with text messages. A message being delivered to an email recipient 270 is delivered in a different manner than a message being sent to a fax machine 274, as is known by those of skill in the art. Similarly, a message being delivered to a voice mailbox 276 will need to be delivered in voice form and if the message was originally received as text, then the appropriate format modification must be made. If a message is being sent to a call-forwarded number 278, the email message content in whatever form may be sent to a recipient at the second telecommunications number. This recipient may be a live person, a voice mailbox (for a fixed-location or a mobile phone or device), an email box, a pager, or a fax machine, for instance.

At the other end, because the email message may be sent over a regular phone line, familiar telecommunications services such as call forwarding, selective call blocking, call waiting, caller ID, and so on, can all be used to modify delivery 262 of the email messages.

In a responding to message step 282 in some instances of the invention, the recipient responds to the previously-received message by using the origin address 220 (which may contain a telecommunications number) as the new destination address.

FIGS. 2 and 2A are meant to assist an understanding of the present invention, not to summarize every aspect of the invention or even every method or structure. The invention is defined by the claims, in view of the entire specification, not merely FIGS. 2 and 2A. In particular, steps may be repeated, as when a message is delivered several times to the same address during the deliver message step 262. Steps may also be omitted. For example, the respond to message step 282 is optional. Steps may also be reordered or done concurrently, unless one step requires the result of a previous step. Moreover, steps may be grouped differently or renamed. Some or all of these variations may be present in an embodiment, regardless of whether they are expressly described or shown as optional outside the claims.

Systems

Figure 3:
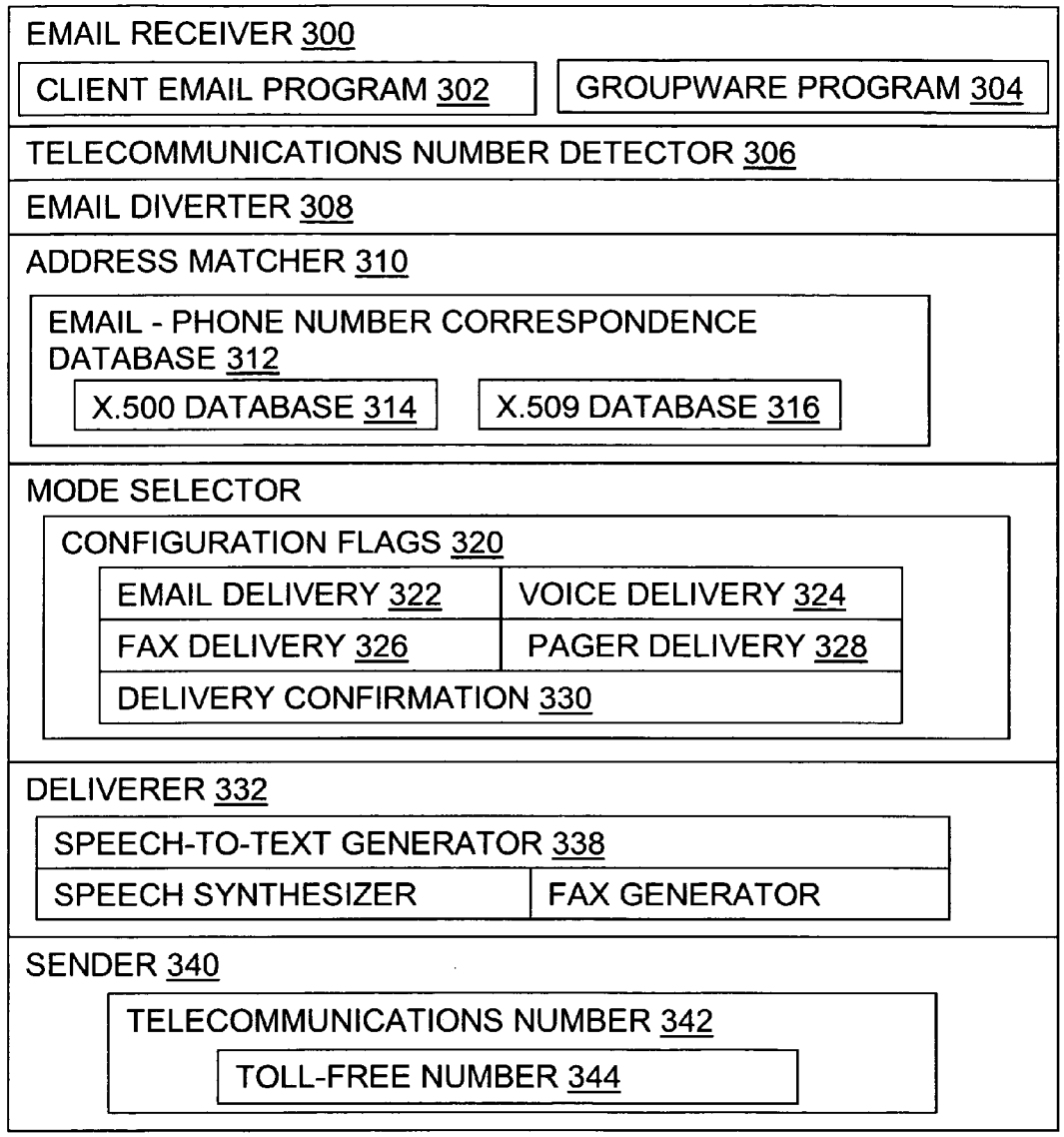
FIG. 3 is a diagram illustrating systems of the present invention.

A system 300 according to the invention is further illustrated in FIG. 3. An email receiver 300 receives email messages, such as those discussed in conjunction with FIGS. 1 and 2. The email message 102 contains a destination address 204 and optional message content 222. The destination address includes a telecommunications number 206. The email receiver 300 may include a client email program 302 (such as QualComm Eudora or Microsoft Outlook software) running on a client machine, a groupware program 304 (such as Novell GroupWise or Lotus software) running on a client machine, web browser software (e.g., a Microsoft or Netscape browser) for accessing an Internet email site, or some other known email receiving program, including email server software on a server computer.

An optional telecommunications number detector 306 intercepts the email. It may be intercepted before the message leaves a computer, at a "packet sniffer" level associated with a network gateway, or somewhere else.

As noted above, one embodiment of the invention uses a "black box" attached to the email telecommunications line as the detector 306. The "black box" includes a packet sniffer to notice when an email message has been sent; such sniffers are known in the art for uses outside the present invention's scope. The "black box" examines the email address. If it determines that the address does not contain a telecommunications number, the message passes through as if the detector had not been present, except possibly for a very small delay. If a telecommunications address is found in the address, the message is then diverted by a diverter 308. The diversion may send all addresses to a predetermined location at which an address matcher 310 resides, or the diverter 308 may choose a location to send the message to depending on the specific telecommunications number within the address. Diverters 308 may use familiar technology from computer and/or telecommunications (wired or wireless) network switches, routers, and the like.

The address matcher 310 in may be embodied within the number detector 306, and will be separate in other instances. The address matcher 310 matches the telecommunications number 206 with an email address for delivery. One inventive system uses a database 312 to provide a correspondence between telecommunications numbers 206 and their respective delivery email addresses. The database may be located on a client machine, a server machine, an email gateway, a web site, within the telecommunications number detector 306, or at some other location.

The delivery email addresses in some instantiations do not themselves contain a telecommunications number. Through call forwarding under the invention, one telecommunications number email address may lead to another telecommunications number email address. But the ultimate delivery email address for a given message may be a conventional address such as a "username@domain" alphanumeric address, a VPIM-type address, an IP address, or the like.

The database 312 may be maintained on a client machine that is entered using call-forwarding from a telecommunications number given in the destination address. Alternately or in addition, some or all of the database may be maintained by the regional telephone company, competitive local exchange carrier (CLEC), incumbent local exchange carrier (ILEC), or other entity. An X.500 database 314 and/or an X.509 database 316 may be used. If the database 312 contains public key certificates, by using the telecommunications numbers as indexes (e.g., pointers) into the stored information, those of skill in the art can implement a system where it is unnecessary for a proposed message recipient to provide its public key expressly in advance to each particular proposed message originator.

The email may be delivered in many forms, as already discussed in connection with FIG. 2A, for instance. Different types of delivery can be specified using configuration flags 320, with a separate flag being used for each separate delivery type, such as email delivery 322 (possibly including wireless delivery), voice delivery 324 (possibly including wireless delivery), fax delivery 326, and pager delivery 328. Special configuration flags can also be used to indicate that delivery should be attempted multiple times until a delivery confirmation 330 has been received. Other flags can be constructed so that if an email address cannot be obtained then another type of delivery, such as voicemail, can be attempted. Some flags may indicate both email message delivery and voice mail delivery. The configuration flags can specify that email delivery, voice delivery, pager delivery, and fax delivery should all be attempted for a given message, or for each message. Similarly, the configuration flags can be set such that the delivery types are ranked (such as first try email, then voice, then pager, then fax) with each specific type tried until a delivery confirmation is received. Flags 320 may be implemented using bitflags, enumerations, arrays, lists, and/or other data structures.

In some instantiations of this invention, the configuration flags 320 may be set dynamically based on algorithms and/or rules that take into account the sender, the urgency of the message, its content, whether or not it was solicited, whether or not it refers to other messages, the date and time at which it is to be received, the length of the message, other recipients to whom the message was also sent, how the recipient has dealt with this type of message in the past, and/or other information available to the algorithm and/or rule. Such dynamic configuration may be used to reflect the recipient's selection of the means of message delivery. For example, a voice call from a babysitter to a recipient while the recipient is at a concert could bring up a message on the recipient's vibrating pager to that effect, while other calls simply go to the recipient's voicemail.

In some instantiations of the present invention, algorithms or rules written in Java or other portable languages may be included explicitly or by reference by the message sender and may interact or negotiate with the algorithms and/or rules specified by the recipient. In each case, an objective is to optimize the means of notification, with the recipient playing a major role instead of allowing the sender to primarily or solely determine the delivery mode(s) used.

Once the modes of delivery are determined, the specific email message can be manipulated appropriately using a deliverer 332. If the message was received as text and is to be sent as voice, then the text is run through a speech synthesizer. Likewise, an email whose message content is voice and is to be delivered by a text means, such as email delivery 322, fax delivery 326, and possibly pager delivery 328, will have the text converted to speech using a speech-to-text generator 338. Speech generation and speech recognition software are known for use in telecommunications outside the scope of the present invention.

An email sender 340 lets a user send the email, to be subsequently received by an email receiver 300. The inventive system allows the email to be initially sent using a messaging service telecommunications number 342, which is not to be confused with the recipient's number 206. The messaging service number 342 can be a toll-free number 344, such as an 800 or 888 number, or it can be a 900 number, or it can be a regular toll call. To use the messaging service, the message originator dials the number 342, speaks the message content 222, and speaks or otherwise provides the recipient's telephone number 206. Thus, the messaging service is a substitute for, or a supplement to, message origination tools such as computers running email programs. The destination address 206 can be specified using a conventional telecommunications number, (for example, the recipient's conventional telephone number) with the address matcher 310 then locating the corresponding delivery email address.

FIG. 3 is meant to assist an understanding of the present invention, not to summarize every aspect of the invention or every system. The systems of the invention are defined by the claims, in view of the entire specification, not merely by FIG. 3. Systems may have more or fewer individual components than are shown in the illustration. For instance, a single system may have more or fewer configuration flags than are illustrated. Likewise, the sender 334 may include more than a messaging service.

An illustrated system component may also be omitted. For example, the X.500 database need not be present in every implementation. Moreover, system components may be grouped differently or renamed. These variations may be present in an embodiment regardless of whether they are expressly described or shown as optional outside of the claims.

Signals

Figure 4:
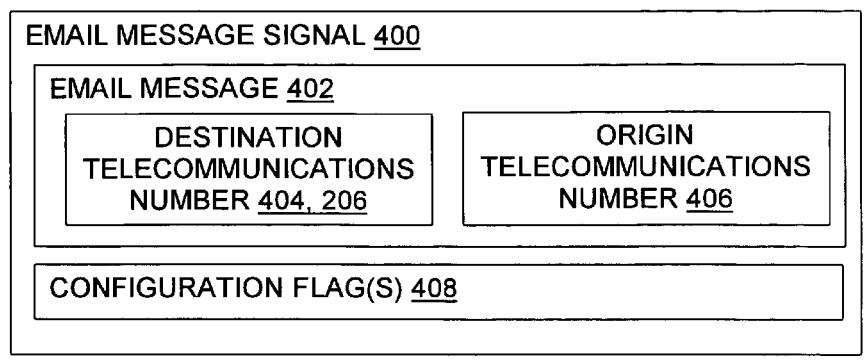
FIG. 4 is a diagram illustrating a signal according to the present invention for using telephone numbers to route email messages.

FIG. 4 illustrates a signal according to the invention. The signal 400 may be embodied in a computer system, memory, storage, in a separate configured program storage medium, and/or in a communication link such as a network signal line or other "wire", including without limitation wireless communications equipment and methodologies. The signal may be used in sending email messages using a telecommunications number as a portion or all of the destination address according to the present invention.

The illustrated signal includes an email message 402 that contains at least one telecommunications number 404, 206 as a portion of the email address, or as the whole email address, as discussed previously. Optionally, the signal 400 may also contain an origin telecommunications number 406. The email message 402 may contain message content 220 distinct from the separate origin and destination telecommunication numbers. The message content may include a voice message, a video message, a text message, or content in another form known to those of skill in the art.

The illustrated signal 400 may also contain one or more configuration flags 408. The configuration flags 408 can be flags 320 used to indicate message delivery format. The flags 408 may also specify encryption, multiple delivery attempts, staggered delivery attempts using different delivery modes, delivery confirmation, specification of dynamically set recipient preferences, and the like. Digital certificates and/or digital signatures can be used for authentication.

The signal 400 components are not necessarily stored contiguous to one another, or even in the same medium, although each necessarily resides somewhere in the system 300 and the components all exist at the time in question. FIG. 4 is meant to assist an understanding of the present invention, not to summarize every aspect of the invention or even every signal. The methods, signals, systems, and configured storage media of the invention are defined by the claims, in view of the entire specification, not merely by FIG. 4. Signal components may be repeated; for example, several configuration flags 408 may be associated with a single signal 400. Signal components may also be omitted. For instance, one embodiment of the invention does not store an origin telecommunications number 406 within the signal 400. Signal components may be stored in different orders or arrangements than that shown, and may be associated to form the signal by being stored together and/or by links such as pointers or table indices. Moreover, signal components may be grouped differently or renamed. These variations may be present in an embodiment regardless of whether they are expressly described or shown as optional outside the claims.

Additional Encryption Information

A basic concept of the invention, from an encryption-oriented point of view, is to use a person's telephone number as a "pointer" to a symmetric or asymmetric set of keys that enable encryption techniques to be employed within the system. The key management architecture provides the following characteristics:
1. Key generation or keypair generation is performed during and/or prior to registration.
2. Keys have a "public" component. This can be accomplished using asymmetric technologies (e.g. RPK, RSA, ECC, DH, El Gamal, and etc.) or symmetric technologies (e.g. split knowledge, shared secret, and etc.)
3. Key agreement/derivation occur without "real-time" negotiation or a-priori public key exchanges between the message recipient and the message sender.
4. Each encryption uses a unique "session" key or is encrypted in the public key of the recipient.

Key Generation

Keys should be generated during and/or prior to registration. The public/private keypair can be generated either "on-line or off-line." On-line refers to the generation of keypairs, via either installed software on the registrant's local machine or software running at the provider's site, prior to the termination of the registration connection. Off-line refers to the generation of keypairs via either installed software on the registrant's local machine or software running at the provider's site, after the termination of the registration connection. The resulting keypairs are then sent to the registrant.

A Possible Scenario

During registration, information is collected from the individual so that required fields, for example, X.509 fields such as distinguished name, can be filled in. The actual generation of the keypairs and resulting X.509 certificate can be created using "in-system" capabilities or outsourced to commercially available Certificate Authorities. The individual's telephone number can be used as the X.509 certificate's "serial number". The serial number is part of the "signed" data of the certificate and therefore provides "binding". "Extensions" to the serial number can be employed to provide multiple identities for a given telephone number. These "extensions" can take the form of numeric values (e.g. 001–999, actual telephone extensions, and etc.), alphabetic characters (e.g. name, initials, and etc.), or a combination thereof. Adding a "citizenship code" as part of the serial number can, as a result of export restrictions, be used to determine the symmetric key length. Examples:

7194953104_001_US

7194953104_Walt_US

Certain asymmetric technologies (RPK) provide fast and easy encryption of data regardless of the size of the data compared to the "modulus" length. If this technology is implemented, the need for additional symmetric key enablers is not required. If this type of asymmetric technology is not implemented, then a symmetric key exchange enabler is required. One method of accomplishing this is to create, during keypair generation, a random number (RN) and with it generate a DH "public" (base$^{RN}$ mod P) Key Negotiation Parameter (KNP). This parameter would be signed with the certificate and KNP. During message creation, the DH function would be accomplished yielding a Unique Bit Pool (UBP) between the two individuals. Mathematically, this is equal to (base)$^{(RN1)(RN2)}$ mod P. Creating a "session" key could be accomplished by using the UBP as a base for another exponentiation process UBP$^{(Key\ ID)}$ mod P, where the Key ID is a value (such as a date/time stamp) that can be passed in the clear as part of the message header. The result yields a Session Key Pool (SKP) that a session key can be derived from. The SKP is secure even though the Key ID was passed in the clear because the UPB becomes the "secret" value of the process.

Public Key Distribution

Gaining real-time access to public keys (or KNPs) without a priori communication with the recipient has been a problem in otherwise secure communication systems. The inventive system could maintain a worldwide database of registrant's public keys (and/or KNPs) and, during the generation or receipt of a message, download the required information. This download process need only happen once. Once downloaded, the information may be stored on the individual's local PC and is valid (and used) unless there is change in the information or the information "expires." Replacement of changed and/or expired information can be handled automatically by the system.

Telephone Number Authentication

If private keys are generated and signed by a central system using a database (on-line key generation as described earlier), one is preferably able to distribute the private key to the correct party and only to the correct party. If private keys are generated by individual communicating systems (off-line key generation as described earlier), those private keys are preferably digitally signed by the central system and they are put into the database 124 only if they are indeed generated by the correct party. Digital certificates may be used to contain and authenticate the keys.

These operations may be performed when the correct party has called the central system using dial-up communications technology. The central system could then use ANI (automatic number identification) and/or Caller-ID to ascertain the calling number and make sure it matches the telephone number embedded in the certificate's serial number. Note that the use of the telephone number in the signed part of the certificate makes the ANI or Caller-ID approach especially applicable to authentication in cases where the telephone number is critical in using the present invention.

SUMMARY

The present invention provides systems, devices, signals, and methods for routing messages. Message originators can use one or more simple in-the-phonebook telecommunications numbers, unlisted numbers, mobile numbers, toll-free numbers, 900 numbers, or the like as addressing indexes in place of conventional addresses such as those in the form username@domain. For instance, a message could be addressed to 1234567, or 123-4567, or 123-456-7890, or +011-1-123-4567, or it might be addressed to @1234567.com. Thus addressed, email can be delivered as conventional email text, as email text generated through voice recognition, as synthesized or live speech which reads the email to a live recipient or a voice mailbox, and/or as a fax or pager message which contains the email text. A combination of novel email addresses, as in the cc or bcc fields or in other multiple recipient messages could be used. A combination of novel email addresses and/or conventional email addresses can also be used.

Multiple deliveries may also be coordinated or staggered in various ways. For instance, use may be made of both the message originator's telephone number and of the message recipient's telephone number. One such use would provide the message originator with a confirmation after the message had been delivered and/or after it had been both delivered and opened. The confirmation could be addressed using the original message originator's telecommunications number, and the confirmation could be delivered as email, voicemail, live speech, pager feed, and/or fax, as discussed above. Another type of multiple delivery would initially try to deliver the original message only by email and would try additional delivery modes (voicemail, fax, pager, wireless, etc.) only if the original email was unopened after a specified period of time had passed or other criteria have been met.

As another example, suppose that a message originator does not know the email address for a desired message recipient but is confident that the recipient will check for new email, and suppose further that the message originator does not necessarily have an email account. The message originator could dial a toll-free or other special messaging service number, speak the message into a system or process, provide the recipient's telephone number, and be confident that the message would be delivered. The invention would use the recipient's telephone number to obtain a conventional email address for ultimate delivery, and would then forward the message to the recipient as email (either as transcribed email text or as a .wav file or other recorded attachment or other messaging means discussed herein).

In this way, email and other messages may be sent to someone whose phone number is known, even if their email address is unknown. Indeed, if they have voice mail through an answering machine or a voicemail service, email can be sent to them for voice delivery even if they have no email address. This removes the burden of maintaining both an email address and a telephone number (and in some embodiments, a fax number and/or a mobile number) for each person in one's contact list. The telephone number alone will suffice. Moreover, telephone numbers are widely published and easily obtained, and telephone directories are both familiar and generally well-maintained.

With respect to email, it will be appreciated that in the Internet community, sending email to an individual without a priori knowledge of their email address is a substantial deterrent to electronic communications. The invention provides a solution to this problem. When a person wishes to send an email but doesn't know the "electronic" address of a recipient, the recipient's telephone number is entered into the "To" field of the email message. Upon recognizing a telephone number in the "To" field, the browser and/or email program (e.g. Netscape, AOL, or Microsoft's Internet Explorer) automatically, and by default, connects to inventive online directory (unless a browser option is set to automatically send the email via the inventive system). Upon connection, the sender can obtain an "electronic" address for the recipient (this may done through an "alias" table), and download the recipient's public key certificate thereby enabling relatively secure communications. If an "electronic" address for the recipient is not available, the message is sent to the recipient via the inventive system (e.g., 123.456.7890@provider.net). The system will deliver the message via notification and/or media translation, depending on the recipient's preferences specified within the database.

With respect to electronic commerce ("e-commerce"), the inventive system can provide a link, through an online directory, between buyers and sellers. This can be accomplished in a manner similar to the e-mail scenario. When a company's website address is unknown to a buyer, the buyer enters the company's telephone number into the browser's "site" field. Upon recognizing a telephone number in the "site" field, the browser (e.g. Netscape, AOL, or Microsoft's Internet Explorer) automatically, and by default, connects to the invention's online directory. Upon connection, the buyer can obtain a "website" deliver address/link for the seller (this may be done through an "alias" table), and download the seller's public key certificate thereby enabling more secure transactions. If a "website" address for the seller is not available, a message is sent to the seller via the system stating that the buyer requests contact information and provides return addressing for the buyer. The system will deliver the message via notification and/or media translation depending on the seller's configuration specified within the database.

As used herein, terms such as "a" and "the" and item designations such as "telecommunications number" are generally inclusive of one or more of the indicated item. In particular, in the claims a reference to an item means at least one such item is required, unless clearly indicated otherwise to one of skill in the art.

The invention may be embodied in other specific forms without departing from its essential characteristics. The described embodiments are to be considered in all respects only as illustrative and not restrictive. Headings are for convenience only. The claims are part of the specification which describes the invention. The scope of the invention is indicated by the appended claims rather than by the foregoing description. All changes which come within the meaning and range of equivalency of the claims are to be embraced within their scope.

What is claimed and desired to be secured by patent is:

1. A method for routing a message, comprising the steps of:
   receiving an email message which includes at least a destination address and may include message content, the destination address including a telecommunications number in place of at least a conventional domain name, wherein the destination address domain name is free of periods;
   attempting to obtain a delivery addressing index which corresponds to the telecommunications number in the destination address;
   selecting at least one delivery mode; and
   if message content is present and a delivery addressing index is obtained, advancing the email message content for delivery using at least one selected delivery mode and the delivery addressing index,
   wherein the telecommunications number is subject to call forwarding to a second telecommunications number, and the advancing step comprises delivering the email message content to a recipient at the second telecommunications number.

2. The method of claim 1, wherein the addressing index includes an email address.

3. The method of claim 1, wherein the addressing index includes a web site address.

4. The method of claim 1, wherein the step of selecting a delivery mode is performed at the direction of a message sender.

5. The method of claim 1, wherein the step of selecting a delivery mode is performed at the direction of a message recipient.

6. The method of claim 1, wherein the telecommunications number used as the destination address is a publicly listed number.

7. The method of claim 6, wherein the publicly listed number is obtained through directory assistance.

8. The method of claim 1, wherein the telecommunications number used as the destination address is an unlisted number.

9. The method of claim 1, wherein the telecommunications number used as the destination address includes a toll-free number.

10. The method of claim 1, wherein the telecommunications number used as the destination address includes a 900 toll number.

11. The method of claim 1, wherein the receiving step receives an email message containing an origin address, the origin address including an origin telecommunications number.

12. The method of claim 11, further comprising the step of responding to the email message using the origin address as the new destination address whose domain name is free of periods.

13. The method of claim 11, wherein the origin telecommunications number is used in place of a conventional alphanumeric origin address domain name.

14. The method of claim 1, wherein the receiving step receives an email message whose destination address contains no alphabetic domain name.

15. The method of claim 1, wherein the receiving step receives an email message whose destination address contains the telecommunications number as the domain name.

16. The method of claim 1, wherein the receiving step receives an email message whose destination telecommunications number is a pre-existing voice line number identifying a telephone number which can also be used for live voice communications.

17. The method of claim 1, wherein the receiving step receives an email message whose destination telecommunications number is a pre-existing voice line number identifying a telephone number which can also be used for voicemail communications.

18. The method of claim 1, wherein the receiving step receives an email message whose destination telecommunications number is a pre-existing fax line number identifying a fax number which can also be used for fax-to-fax communications.

19. The method of claim 1, wherein the receiving step receives an email message whose destination telecommunications number is a pre-existing internet connection line number identifying a internet connection number which can also be used for internet access.

20. The method of claim 1, wherein the receiving step receives an email message whose message content is located at least in part in text in a subject field.

21. The method of claim 1, wherein the receiving step receives an email message whose message content is located at least in part in text in a message field.

22. The method of claim 1, wherein the receiving step receives an email message whose message content is located at least in part in text in an attached file.

23. The method of claim 1, wherein the receiving step receives an email message whose message content is formatted according to Multipurpose Internet Mail Extensions format.

24. The method of claim 1, wherein the attempting step attempts to obtain a delivery email address that includes an alphanumeric user name and an alphanumeric domain name.

25. The method of claim 1, wherein the attempting step attempts to obtain a delivery email address that includes attribute-value pairs.

26. The method of claim 1, wherein the attempting step attempts to obtain a delivery addressing index using a database maintained on a client machine on which the email message was composed.

27. The method of claim 1, wherein the attempting step uses the telecommunications number as an index into a database of public keys to obtain a public key corresponding to the telecommunications number.

28. The method of claim 1, wherein the attempting step attempts to obtain a delivery addressing index using a database maintained on an email server machine.

29. The method of claim 28, wherein the email server machine utilizes Simple Mail Transfer Protocol.

30. The method of claim 1, wherein the attempting step attempts to obtain a delivery addressing index using a database maintained on an email gateway which separates a network from the Internet, and the email message was composed on a machine in the network.

31. The method of claim 1, wherein the selecting step selects voice delivery as a delivery mode.

32. The method of claim 1, wherein the advancing step uses a wireless communications link.

33. The method of claim 1, wherein the attempting step succeeds in obtaining a delivery email address as the addressing index and the selecting step selects email text delivery as a delivery mode.

34. The method of claim 33, wherein the selecting step also selects voice delivery as a delivery mode and the advancing step comprises synthesizing speech from text in the email message content and then delivering the synthesized speech to a recipient at the telecommunications number.

35. The method of claim 34, wherein the delivering step delivers the synthesized speech to a voicemail box recipient.

36. The method of claim 34, wherein the delivering step delivers the synthesized speech to a live recipient.

37. The method of claim 33, wherein the selecting step also selects fax delivery as a delivery mode and the advancing step comprises generating a fax containing the email message content and then delivering the fax to a fax machine at the telecommunications number.

38. The method of claim 1, wherein the attempting step fails to obtain an email address, the selecting step selects voice delivery as a delivery mode, and the advancing step comprises synthesizing speech from text in the email message content and then delivering the synthesized speech to a recipient at the telecommunications number.

39. The method of claim 38, wherein the delivering step delivers the synthesized speech to a voicemail box recipient.

40. The method of claim 38, wherein the delivering step delivers the synthesized speech to a live recipient.

41. The method of claim 1, wherein the attempting step fails to obtain a delivery email address, the selecting step selects fax delivery as a delivery mode, and the advancing step comprises generating a fax containing the email message content and then delivering the fax to a fax machine recipient at the telecommunications number.

42. The method of claim 1, wherein the telecommunications number identifies a pager, and the advancing step comprises delivering the email message content to the pager.

43. A method for routing a message, comprising the steps of:
receiving an email message which includes at least a destination address and may include message content, the destination address including a telecommunications number in place of at least a conventional domain name, wherein the destination address domain name is free of periods;
attempting to obtain a delivery addressing index which corresponds to the telecommunications number in the destination address;
selecting at least one delivery mode; and if message content is present and a delivery addressing index is obtained advancing the email message content for delivery using at least one selected delivery mode and the delivery addressing index, wherein the telecommunications number is subject to call forwarding to a second telecommunications number, the attempting step attempts to obtain a delivery email address using a database which is accessed using the second telecommunications number and which uses the telecommunications number as a pointer to the delivery email address within the database, and the advancing step comprises delivering the email message content to a recipient reached using the email address.

44. A system for routing messages comprising:

an email receiver which receives an email message that includes at least a destination address and message content, the destination address including a telecommunications number in place of at least a domain name, wherein the destination address domain name is free of periods;

an address matcher which attempts to obtain a delivery email address that corresponds to the telecommunications number in the destination address;

a mode selector that selects at least one delivery mode; and a deliverer that advances the email message content for delivery using at least one selected delivery mode, wherein more than one entity has a delivery email address that corresponds to the telecommunications number in the destination address and the address matcher attempts to obtain a delivery email address for an entity that is geographically nearest an originator of the email message.

* * * * *